United States Patent
Knowles et al.

(10) Patent No.: US 10,090,676 B2
(45) Date of Patent: Oct. 2, 2018

(54) AIRCRAFT DC POWER DISTRIBUTION SYSTEMS AND METHODS

(71) Applicants: Jeffrey A. Knowles, Yorba Linda, CA (US); Keith J. Cleek, Carlsbad, CA (US); Chris K. Lee, Monterey Park, CA (US); Tad W. Theno, League City, TX (US); Ivan H. Wong, Huntington Beach, CA (US)

(72) Inventors: Jeffrey A. Knowles, Yorba Linda, CA (US); Keith J. Cleek, Carlsbad, CA (US); Chris K. Lee, Monterey Park, CA (US); Tad W. Theno, League City, TX (US); Ivan H. Wong, Huntington Beach, CA (US)

(73) Assignee: Northrop Grumman Systems Corporation, Falls Chuch, VA (US)

( * ) Notice: Subject to any disclaimer, the term of this patent is extended or adjusted under 35 U.S.C. 154(b) by 480 days.

(21) Appl. No.: 14/729,925

(22) Filed: Jun. 3, 2015

(65) Prior Publication Data
US 2016/0359324 A1 Dec. 8, 2016

(51) Int. Cl.
| | |
|---|---|
| *H02J 3/38* | (2006.01) |
| *H02J 1/10* | (2006.01) |
| *H02J 3/00* | (2006.01) |
| *H02J 4/00* | (2006.01) |
| *B64D 47/00* | (2006.01) |
| *H02M 7/02* | (2006.01) |
| *H02J 13/00* | (2006.01) |

(52) U.S. Cl.
CPC ............... *H02J 3/00* (2013.01); *B64D 47/00* (2013.01); *H02J 1/10* (2013.01); *H02J 3/38* (2013.01); *H02J 4/00* (2013.01); *H02M 7/02* (2013.01); *H02J 13/0062* (2013.01)

(58) Field of Classification Search
CPC ............ H01F 38/14; H02J 50/10; H02J 5/005
USPC ......................................................... 307/9.1
See application file for complete search history.

(56) References Cited

U.S. PATENT DOCUMENTS

| | | | |
|---|---|---|---|
| 4,403,292 A * | 9/1983 | Ejzak | B64D 47/00 |
| | | | 307/19 |
| 6,931,856 B2 | 8/2005 | Belokon et al. | |
| 7,116,003 B2 | 10/2006 | Hoppe | |
| 7,210,653 B2 | 5/2007 | Atkey et al. | |
| 7,285,871 B2 | 10/2007 | Derouineau | |
| 7,400,065 B2 | 7/2008 | Michalko | |
| 7,439,634 B2 | 10/2008 | Michalko | |

(Continued)

OTHER PUBLICATIONS

International Search Report for corresponding PCT/US2016/031748 dated Aug. 3, 2016.

*Primary Examiner* — Hal Kaplan
(74) *Attorney, Agent, or Firm* — Tarolli, Sundheim, Covell & Tummino LLP

(57) ABSTRACT

Systems and methods are provided for distributing DC power in an aircraft. In one example, a method is provided that includes generating a plurality of DC voltages from a plurality of independent sources driven by one or more turbines of the aircraft, providing each of the plurality of DC voltages to respective dedicated DC buses, and setting a plurality of switches that selectively couples a first set of dedicated DC buses to a synchronization bus to allow for bus sharing between the first set of dedicated DC buses and bus isolation of a second set of dedicated DC buses.

20 Claims, 3 Drawing Sheets

(56) References Cited

U.S. PATENT DOCUMENTS

| | | |
|---|---|---|
| 7,468,561 B2 | 12/2008 | Kern et al. |
| 7,538,521 B2 | 5/2009 | Berenger |
| 7,663,264 B2 | 2/2010 | Dubois et al. |
| 7,876,542 B2 | 1/2011 | Rozman et al. |
| 7,936,086 B2 | 5/2011 | Yue et al. |
| 7,950,606 B2 | 5/2011 | Atkey et al. |
| 8,136,756 B2 | 3/2012 | Duces et al. |
| 8,330,291 B2 | 12/2012 | Kumar |
| 8,344,544 B2 | 1/2013 | Rozman et al. |
| 8,447,441 B2 | 5/2013 | Calvignac et al. |
| 8,492,915 B2 | 7/2013 | Koeppen et al. |
| 2005/0056021 A1 | 3/2005 | Belokon et al. |
| 2006/0097578 A1* | 5/2006 | Baldwin ............ H02J 1/16 307/66 |
| 2008/0234838 A1 | 9/2008 | Ghanekar et al. |
| 2009/0189455 A1 | 7/2009 | Rusan et al. |
| 2009/0224599 A1* | 9/2009 | Yue ............ H02J 1/10 307/9.1 |
| 2010/0038961 A1* | 2/2010 | Divito ............ F02D 25/00 307/9.1 |
| 2010/0094490 A1* | 4/2010 | Alston ............ B63H 21/17 701/21 |
| 2012/0001481 A1 | 1/2012 | Koeppen et al. |
| 2012/0232728 A1* | 9/2012 | Karimi ............ H02J 3/38 701/22 |
| 2013/0062885 A1 | 3/2013 | Taneja |
| 2013/0099560 A1 | 4/2013 | Shipley et al. |
| 2014/0268430 A1* | 9/2014 | Bourgeau ............ H02H 11/005 361/20 |
| 2015/0103457 A1* | 4/2015 | Shander ............ H02J 3/006 361/88 |
| 2015/0123463 A1* | 5/2015 | Huang ............ F01D 15/10 307/9.1 |
| 2016/0109179 A1* | 4/2016 | McCarthy ............ F25J 1/0284 62/613 |

* cited by examiner

AIRCRAFT DC POWER DISTRIBUTION SYSTEMS AND METHODS

TECHNICAL FIELD

This disclosure relates generally to power systems, and more particularly to aircraft DC power distribution systems and methods.

BACKGROUND

Efficiency, for an electrical system, can refer not only to minimizing losses in individual system components, but can also entail minimizing the amount of hardware in the system as well as optimizing the manner in which power is generated, converted and distributed by that electrical system. This is especially true for aircraft which needs to rely on a limited number of power generating sources and distribution components it can reasonably carry on board for providing electrical power.

Generators on aircraft may be driven with various prime movers, such as turbine engines. In many cases, a prime mover may drive a generator only as an ancillary function. A typical primary function for a prime mover, such as a turbine engine, may be to provide propulsion thrust for the aircraft. In the context of its primary function, the prime mover may operate at varying rotational speeds. Therefore, a generator coupled to a shaft of such a variable-speed prime mover may rotate at varying speeds. Additionally, a generator load may become large enough to negatively affect engine thrust output. Because of recent increases in electrical power demand of aircraft, a single generator driven by a single prime mover may not be capable of producing all of the electrical power for an aircraft. Consequently, an aircraft may be provided with multiple generators, each driven by different prime movers.

Certain aircraft operating conditions may arise in which a particular generator may be subjected to a particularly high load demand during a time when its associated prime mover may be performing its primary function (e.g. producing thrust) at a relatively low speed. In order to meet the high electrical power requirement of an attached generator, it may be necessary to increase the speed of the prime mover, even though such an increase in speed may not otherwise be required for the primary function of the prime mover. Excessive fuel may be consumed if and when a prime mover is operated at a speed greater than required for its primary role. Certain design efforts have been directed to this issue. For example multiple generators may be driven on different shafts of a turbine machine. The turbine machine may have a low-pressure turbine output shaft and a high-pressure turbine output shaft. A separate generator may be driven by each of the shafts. Electrical outputs of the generators may be shared and controlled so that electrical loads may be allocated to either the low-pressure turbine or the high-pressure turbine as a function of turbine operating speed. This allocation may facilitate more efficient operation of the turbine machine.

Historically, multiple generators and distribution channels are employed within an aircraft such that a fault in any one system will not either jeopardize safe operation of the aircraft or compromise the aircraft's ability to complete its mission. While this has proven to be a robust approach, it does create a redundancy that reduces the overall efficiency of the electrical system itself, as well as the efficiency of other aircraft systems with which it interfaces such as propulsion and thermal management systems.

SUMMARY

In one example, an aircraft power system is provide that comprises a plurality of generators that generate respective AC voltage signals in response to mechanical energy generated by one or more aircraft turbines, a plurality of AC/DC converters that each receive a respective AC output signal from a respective generator and generate a respective DC voltage, and a plurality of dedicated DC buses, wherein each dedicated DC bus is associated with a respective generator and a respective AC/DC converter to receive a respective DC voltage. Each dedicated bus provides power to one or more associated dedicated bus loads. A synchronization bus is selectively coupleable to each dedicated DC bus by respective synchronization bus line switches to allow for bus sharing between a first set of dedicated DC buses of the plurality of dedicated DC buses and bus isolation of a second set of selected dedicated DC buses of the plurality of dedicated DC buses.

In another example, an aircraft power system is provided that comprises a first generator that generates a first AC voltage signal from a high pressure spool, a second generator that generates a second AC voltage signal from a low pressure spool, a first AC/DC converter that converts the first AC voltage signal to a first DC voltage, and a second AC/DC converter that converts the second AC voltage signal to a second DC voltage signal. The aircraft power system further comprises a first dedicated DC bus that receives the first DC voltage and provides the first DC voltage to one or more first dedicated bus loads, a second dedicated DC bus that receives the second DC voltage and provides the second DC voltage to one or more second dedicated bus loads, and a synchronization bus selectively coupleable to the first dedicated bus by a first bus line switch and the second dedicated bus by a second bus line switch to allow for selective bus sharing between the first and second dedicated buses, wherein there are not any bus loads that are directly coupled to the synchronization bus. A bus controller controls the selective closing and opening of the synchronization bus line switches.

In another example, a method for distributing DC power in an aircraft is provided that includes generating a plurality of DC voltages from a plurality of independent sources driven by one or more turbines of the aircraft, providing each of the plurality of DC voltages to respective dedicated DC buses, and setting a plurality of switches that selectively couples a first set of dedicated DC buses to a synchronization bus to allow for bus sharing between the first set of dedicated DC buses and bus isolation of a second set of dedicated DC buses.

DETAILED DESCRIPTION

Direct current (DC) power distribution systems and methods are provided for aircraft that leverage multiple power generating sources driven by multiple engine spools and can employ aircraft-level advanced control algorithms governing aircraft-quality advanced components. This electrical power distribution technique for an aircraft, through intelligent control of advanced components, affords an aircraft the ability to provide, for a given weight and volume, greater power generation capability and a more fault-tolerant distribution system. The electrical power distribution systems and methods can take advantage of low-pressure spool horsepower extraction since, for a given specific fuel consumption, it is more efficient than extracting horsepower from the high-pressure spool of the engine. The electrical power distribution techniques combine and dynamically control DC power sharing from each generator in an intelligent manner based on different states of the aircraft and the turbines driving the generators through selectively coupling and decoupling of DC power from dedicated busses to and from a separate synchronization bus.

Figure 1:
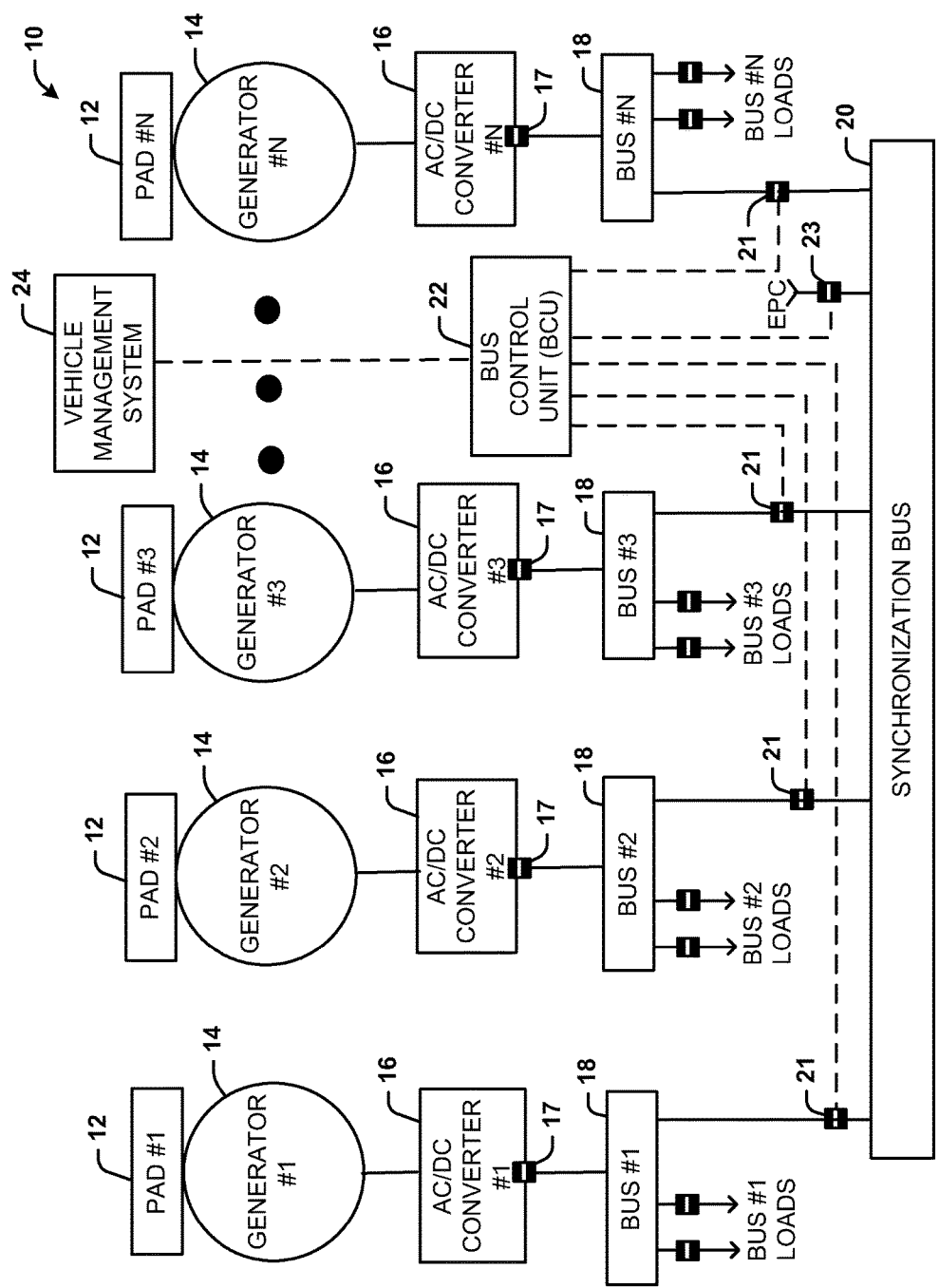
FIG. 1 illustrates an example of an N-channel direct current (DC) power distribution system (PDS) for sharing power requirements of different types of aircraft electrical system loads.

FIG. 1 illustrates an example of an N-channel direct current (DC) power distribution system (PDS) 10 for sharing power requirements of different types of aircraft electrical system loads. The N-channel DC power distribution system includes a plurality of variable frequency generators 14, labeled, #1 through #N, coupled to respective engine driven gearbox pads 12, labeled, #1 through #N, where N is an integer greater than one. The gearbox pad 12 can be mounted on a high pressure spool, a low pressure spool or on an auxiliary power unit (APU) of the aircraft. An aircraft can include a high pressure spool and a low pressure spool for each engine turbine (e.g., left and right) of the aircraft, and an APU that is driven by a turbine at the tail of the aircraft.

An AC/DC converter 16, also labeled #1 through #N, converts alternating current (AC) voltage from the generator to DC voltage to be provided to a dedicated bus 18, labeled Bus #1 through Bus #N, for each respective generator via a bus line contactor (BLC) switch 17 disposed between the output of the AC/DC converter 16 and its respective dedicated DC bus 18. The BLC switch 17 can be closed during normal operation and opened as a result of a fault. Each DC dedicated bus 18 drives one or more dedicated loads (Bus #1 to Bus #N loads) of the aircraft. Each of the DC dedicated buses 18 are coupled to a DC synchronization bus 20 via respective synchronization bus line (SBL) switches 21, also referred to as bus tie-breaker (BTB) switches, to allow for selective coupling and decoupling of dedicated buses 18 to the synchronization bus 20, thus allowing for DC power sharing of selected dedicated buses 18 and DC power isolation for other dedicated buses 18.

The system 10 includes a bus control unit (BCU) 22 that controls the opening and closing of the SBL switches 21, and the selective coupling and decoupling of SBL switches 21 to the synchronization bus 20, and thus allowing for power sharing among selected dedicated buses 18 and power isolation amongst other dedicated buses 18. The synchronization bus 20 is coupled to an external power contractor (EPC) 23, which enables power to be provided to on board aircraft systems. The BCU 22 is coupled to an aircraft vehicle management system (VMS) 24, which controls the aircraft and its electrical system. The BCU 22 and VMS 24 can communicate with another to provide load sharing commands, fault information and commands and a variety of other information useful for communicating between the two units. In one example, the BCU 22 can rely on discrete logic-based decisions on generator and bus arrangements, as it performs fault detection, isolation and power distribution in addition to information provided to the BCU 22 by the VMS 24 on the aircrafts operating parameters.

Figure 2:
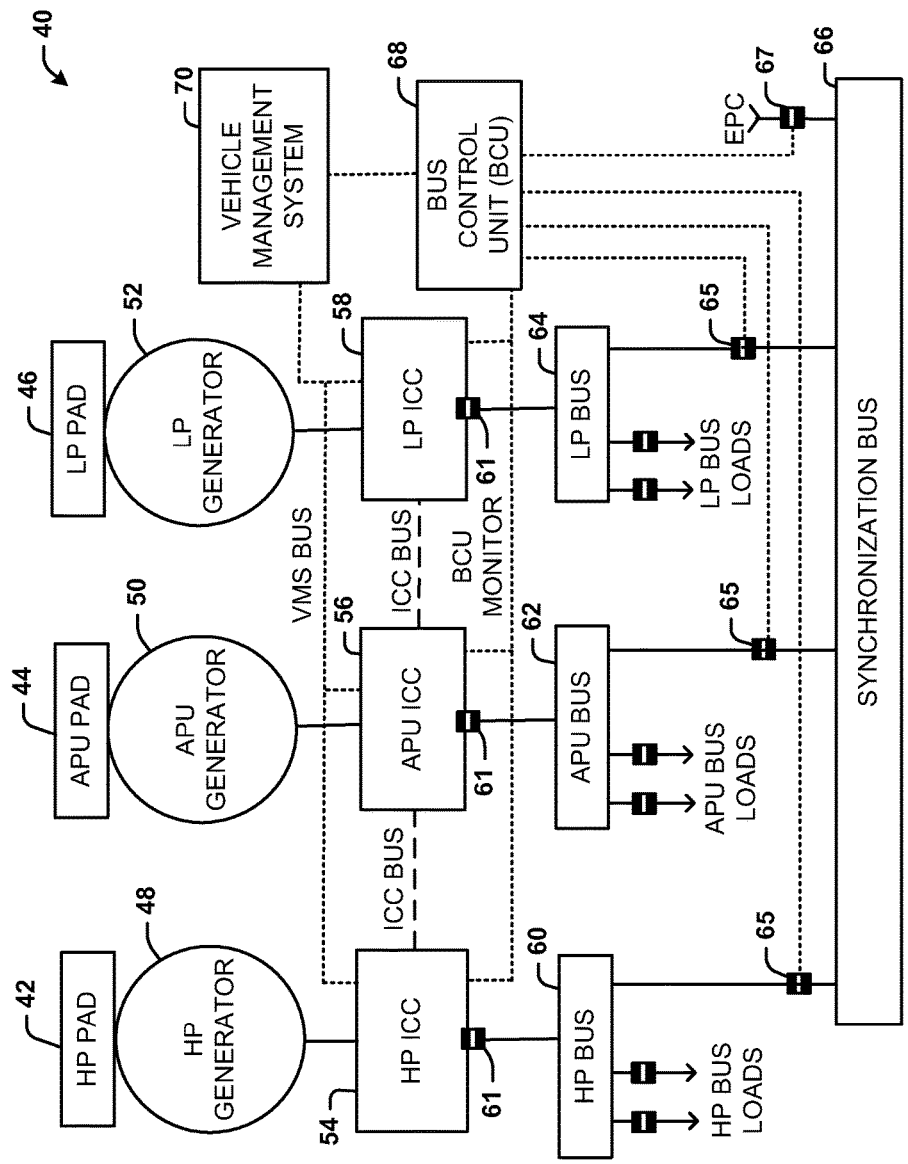
FIG. 2 illustrates a 3-channel DC PDS for sharing power requirements of different types of aircraft electrical systems (electrical loads).

FIG. 2 illustrates a 3-channel DC PDS 40 for sharing power requirements of different types of aircraft electrical systems (electrical loads). The 3-channel DC PDS 40 comprises three DC power channels that are arranged in parallel with respect to one another. A first DC power channel comprises a high pressure (HP) generator 48 configured to generate HP alternating current (AC) power and is coupled to a HP Pad 42 (e.g., a gearbox). HP Pad 42 is configured to convert mechanical energy (ME) generated by a HP spool of an aircraft engine to electrical energy from which the HP generator 48 utilizes to generate HP-AC power. The HP generator 48 is further coupled to an HP-Inverter-Converter-Controller (ICC) 54 that is configured to convert the HP-AC power to HP-DC power, and supply the HP-DC power to a dedicated HP Bus 60 for distribution to HP-DC electrical bus loads. The 3-channel PDS further comprises a second DC power channel that includes a low pressure (LP) generator 52 coupled to an LP Pad 46 (similar in function as the HP Pad 42), and is configured to supply LP-AC power to an LP-ICC 58, which is configured to convert the LP-AC power to LP-DC power and supply the LP-DC power to a dedicated LP Bus 64 for distribution to the LP-DC electrical bus loads.

The 3-channel PDS 40 further comprises a third DC power channel that includes an auxiliary generator (e.g., an auxiliary power unit (APU)) coupled to APU Pad 44 (similar in function as HP Pad 42 and LP Pad 46), and is configured to supply APU-AC power to an APU-ICC 56, which is configured to convert the APU-AC power to APU-DC power and supply the APU-DC power to dedicated APU Bus 62 for distribution to APU electrical bus loads. HP Bus 60, APU Bus 62, and LP Bus 64, respectively, of each DC power channel of the 3-channel PDS are coupled to a respective SBL switches 65 that allows coupling and decoupling between respective dedicated HP Bus 60, APU Bus 62, and LP Bus 64 with a synchronization bus 66. The synchronization bus 66 is coupled to an external power contactor (EPC) 67, which enables power to be provided to on board aircraft systems. However, no aircraft loads are connected directly to the synchronization bus 66. Each ICC 54, 56 and 58 has a bus line contactor (BLC) switch 61 at which its input is the point of regulation (POR) for the generating system and to which its output is connected a respective dedicated DC bus.

The 3-channel PDS further comprises a BCU 68 housing executable instructions that control each DC power channel of the 3-channel PDS 40 in cooperation with a VMS 70 in an intelligent manner based on changes (variations) in aircraft operating parameters (e.g., changes in fuel quantity, engine performance, altitude, airspeed, etc). For example, during normal flight operations (e.g., when the aircraft operating parameters are non-varying), the BCU 68 in cooperation with the VMS 70 can maintain each SBL switch 65 of each DC power channel in an open condition. Since each SBL 65 of each DC power channel is open, each DC power channel satisfies the power requirements of the electrical loads that are coupled at their respective dedicated bus.

However, when the aircraft starts deviating from normal flight operations, for example during an altitude change, the BCU 68 in cooperation with the VMS 70 can be configured to control the HP-ICC 54, the LP-ICC 58, the APU-ICC 56, and each SBL 65 (e.g., by changing the SBL to a closed condition), as illustrated in FIG. 2 with dashed lines, so that power requirements of electrical loads that are coupled to each bus is dynamically shared (distributed) amongst one or more of the HP, APU and LP generators 48, 50 and 52, respectively. Dynamically sharing the power requirements of the electrical loads coupled to a respective DC power channel with other DC power channels reduces an amount of horsepower required to be extracted by a respective generator (e.g., HP generator) to satisfy the power requirements of the electrical loads.

In one example, the systems and methods can operate multiple 270Vdc generating systems in parallel with one another in a robust and stable manner. This can be achieved through the use of both voltage and current feedback loops to continuously update the voltage regulation at the respective POR of each generating system such that no single generating system overrides another. Voltage regulation of each generating system operating in parallel is such that as a combined system, it can conform to Mil-Std-704F power quality utilizing a delta-voltage between generating systems of less than 5.0Vdc.

Similar to a conventional electrical system, during normal operation with all three SBLs open, the three channels can be operated stand-alone as three separate generators feeding regulated 270Vdc power to their respective dedicated buses. Dynamically, in response to a change in conditions, any two, or all, of the SBLs are closed thereby forcing two or more of the DC generating systems in parallel with one another. The generating systems therefore now share the aircraft loads that are connected to the individual dedicated buses through the closed SBLs 65 via the synchronization Bus 66. The amount of the total aircraft electrical load that each generating system is set to supply can be set by a ratio asserted by the VMS 70. This ratio can be determined through contemplating numerous aircraft operating parameters and can be continuously updated while any two or more channels are operating in parallel in effort to maximize overall aircraft operating efficiency and performance. Example aircraft operating parameters may include generator maximum power output ratings, total aircraft electrical load, air speed, altitude, fuel quantity, engine performance and thermal management system performance.

Taking engine performance for example, continuously adjusting the sharing ratio allows for the dynamic shifting of horsepower extraction between HP and LP spools of the same, or a separate, engine as well as an APU, as aircraft and engine performance conditions dictate. More immediate local control of the system, in terms of its configuration through the open and closure of the SBLs and EPC, is accomplished by the BCU as it contemplates discrete inputs from the ICCs and the aircraft. Examples of BCU inputs are ICC over-current, ICC stop-parallel, ICC fault, SBL status, bus over-current and external power monitoring. Through discrete logic, the BCU can rapidly reconfigure the PDS as faults occur and clear within the system.

In one example, the BCU can rely on discrete logic-based decisions on generator and bus arrangement, or grid configuration, as it performs fault detection, isolation and coordination. Should a source go off-line, or should a fault occur in the distribution system, the BCU, with discrete inputs from the aircraft and the ICCs, commands the SBLs open or closed within 5.0 ms of the event. In the event of a bus over-current, the BCU logic will operate faster, opening the SBLs isolating the fault, than that of the ICC protective functions as to prevent that downstream fault from taking viable sources off-line. In conventional stand alone mode, should a source trip off, the BCU will close SBLs allowing the remaining sources to parallel and share the load that had been supplied by the now-off-line generator.

In another example, a load share command can be issued by the VMS to provide a share ratio command to the generating systems to govern the amount of power each is supplying to the total load demanded by the vehicle. In the three-channel system, for example, this command is expressed in a percentage similar to 20%:35%:45%, HP:LP:APU. The percentage of the aircraft total load that any one generator can supply based on a number of VMS-determined aircraft operating parameters including generator maximum power output ratings, total aircraft electrical load, air speed, altitude, fuel quantity, engine performance and thermal management system performance. As built, the 3-channel PDS in FIG. 2 can have a set of default load share ratios programmed into the ICCs such that as the BCU informs the ICCs of the requirement to reconfigure the system, the ICCs can immediately revert to a given set of ratios. In this case, these default ratios are set based on each generating systems' maximum continuous output ratings, for example, 13%:43.5%:43.5%.

In another example, advanced energy storage is provided. It can be employed in both high voltage battery (270V nominal) and low voltage battery (28V nominal) applications, each contributing to the overall efficiency of the electrical system and the aircraft. The 270V battery is floated on the 270Vdc bus allowing it to immediately fill-in when large on-load transients are applied to the bus as well as absorb energy when large off-load transients or regenerative energy events occur in the system. This allows the generating system to not be over-sized to handle these excursions as well as mitigates horsepower extraction transients on the engine and the engine gearbox. The 28V batteries can be employed in a similar floating fashion, but are physically distributed throughout the aircraft in effort to both minimize voltage drop to the flight-critical loads as well as allow for better response in transient suppression.

Distribution of electrical power in the systems and methods can be performed by both conventional electro-mechanical switch devices and by solid-sate switch devices. The BLC switches and the SBL switches can be electro-mechanical switches, while the individual load switches can be solid-state devices. The solid-state devices provide faster switch times than conventional contactors and are programmed with trip curves and inrush limiting curves such that both normal and abnormal operation of the various aircraft loads can be managed in a timely manner. Fault detection and isolation begins with solid-state load switches and is coordinated with the BCU and ICC protective functions such that a fault with a load is managed accordingly.

Integrating high-power batteries into an electrical system brings with it the need to safely connect and disconnect to and from a bus. If a fault occurs when a battery is sourcing a bus, or when a battery is applied to an already-faulted bus, a method of interrupting that fault current is required in effort to preserve the hardware. The systems and methods can employ an advanced contactor that is designed to make and break battery-sourced fault currents in excess of 8,000 amps.

The systems and methods can make use of carbon nano-tube cables as another method of improving overall efficiency. Carbon nano-tube cables have been identified as showing up to approximately 40% in cable weight savings, especially when used in shielding of twisted-pair communication lines. In addition, carbon nano-tube signal cables have an improved cable and harness flexibility, improved bend radii and improved thermal performance.

Figure 3:
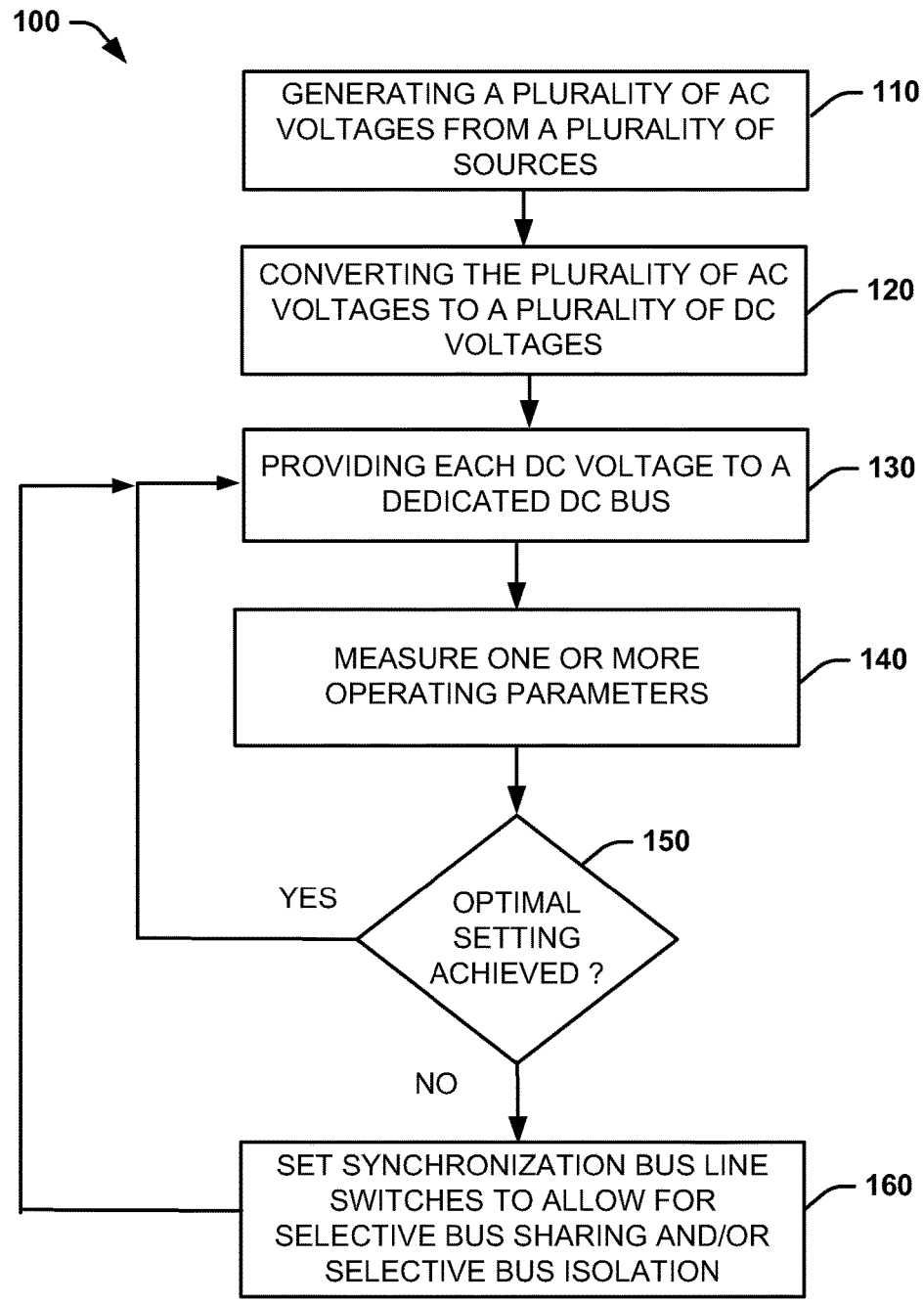
FIG. 3 illustrates a flow diagram of a method for distributing DC power in an aircraft.

In view of the foregoing structural and functional features described above, an example methodology will be better appreciated with reference to FIG. 3. While, for purposes of simplicity of explanation, the methodology of FIG. 3 is shown and described as executing serially, it is to be understood and appreciated that the present invention is not limited by the illustrated order, as some actions could in other examples occur in different orders and/or concurrently from that shown and described herein.

FIG. 3 illustrates a flow diagram of a method 100 for distributing DC power in an aircraft employing a synchronization bus selectively coupleable to dedicated DC buses by respective synchronization bus line switches. The methodology begins at 110 where a plurality of AC voltages are generated from a plurality of sources. The plurality of sources could be generators associated with one or more HP and/or LP spools driven by one or more engine turbines. Additionally, the plurality of sources could be an APU driven by an engine turbine at a tail of the aircraft. The methodology then proceeds to 120, where the plurality of AC voltages are converted to a plurality of DC voltages, for example, by a plurality of AC/DC converters. At 130, each DC voltage is provided to a respective dedicated DC bus that is coupled to respective dedicated bus loads. The methodology then advances to 140.

At 140, one or more operating parameters are measured associated with the PDS of the aircraft and/or the operation of the aircraft. The methodology then proceeds to 150. At 150, it is determined whether or not the optimal settings for bus sharing and/or bus isolation has been selected based on the one or more operating parameters. That is whether certain buses should be coupled to the one another through the synchronization bus, and whether certain buses should be isolated from the synchronization bus based on the measured operating parameters. If the optimal setting has not been achieved (NO), the methodology proceeds to 160 to set the synchronization bus line switches for selective bus sharing and/or selective bus isolation based on the measured parameters. If the optimal setting has been achieved (YES), the methodology returns to 130 to repeat the providing of DC voltages to dedicated bus, the measuring of one or more parameters at 140, and the determining of optimal setting at 150.

What have been described above are examples. It is, of course, not possible to describe every conceivable combination of structures, components, or methods, but one of ordinary skill in the art will recognize that many further combinations and permutations are possible. Accordingly, the invention is intended to embrace all such alterations, modifications, and variations that fall within the scope of this application, including the appended claims. Where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. An aircraft power distribution system comprising:
    a plurality of generators, associated with an aircraft, that generate respective AC voltage signals in response to mechanical energy generated by one or more aircraft turbines;
    a plurality of AC/DC converters, associated with the aircraft, that each receive a respective AC output signal from a respective generator and generate a respective DC voltage;
    a plurality of dedicated DC buses, wherein each dedicated DC bus is associated with a respective generator and a respective AC/DC converter to receive a respective DC voltage, each dedicated bus providing power to one or more associated dedicated bus loads;
    a synchronization bus selectively coupleable to each dedicated DC bus by respective synchronization bus line switches to allow for bus sharing between a first set of dedicated DC buses of the plurality of dedicated DC buses and isolating a second set of selected dedicated DC buses of the plurality of dedicated DC buses; and
    a vehicle management system to issue a load share command, to the plurality of AC/DC converters, that governs a percentage of power that is supplied by each of the plurality of AC/DC converters.

2. The system of claim 1, further comprising a bus controller that controls the selective closing and opening of the synchronization bus line switches.

3. The system of claim 2, wherein the bus controller is communicatively coupled to the vehicle management system of the aircraft to at least one of receive commands and share status information on a state of at least one of the aircraft power distribution system and the aircraft.

4. The system of claim 2, wherein the bus controller receives discrete input feedback from the power distribution system in determining a state of the synchronization bus line switches.

5. The system of claim 2, wherein each AC/DC converter is part of an inverter controller that communicates with the bus controller to share status information of the power distribution system.

6. The system of claim 5, wherein each inverter controller includes a bus line contactor switch that couples and decouples the respective AC/DC converter from its respective dedicated bus.

7. The system of claim 1, wherein at least one of the generators is associated with a high pressure spool of the aircraft, and at least one of the generators is associated with a low pressure spool of the aircraft.

8. The system of claim 1, wherein at least one of the generators is associated with an auxiliary power unit of the aircraft.

9. The system of claim 1, wherein the plurality of generators comprise a first generator associated with a first high pressure spool coupled to a first engine of the aircraft and a second generator associated with a first low pressure spool coupled to the first engine of the aircraft, and a third generator associated with a second high pressure spool coupled to a second engine of the aircraft and a fourth generator associated with a second low pressure spool coupled to the second engine of the aircraft.

10. An aircraft power distribution system comprising:
    a first generator, associated with an aircraft, that generates a first AC voltage signal from a high pressure spool;
    a second generator, associated with the aircraft, that generates a second AC voltage signal from a low pressure spool;
    a first AC/DC converter, associated with the aircraft, that converts the first AC voltage signal to a first DC voltage;
    a second AC/DC converter, associated with the aircraft, that converts the second AC voltage signal to a second DC voltage signal;
    a first dedicated DC bus that receives the first DC voltage and provides the first DC voltage to at least one first dedicated bus load;
    a second dedicated DC bus that receives the second DC voltage and provides the second DC voltage to at least one second dedicated bus load;
    a synchronization bus selectively coupleable to the first dedicated DC bus by a first bus line switch and the second dedicated DC bus by a second bus line switch to allow for selective bus sharing between the first and second dedicated DC buses, wherein there are not any bus loads that are directly coupled to the synchronization bus;

a bus controller that controls selective closing and opening of the first and second synchronization bus line switches; and a vehicle management system to issue a load share command, to the first and second AC/DC converters, that governs a percentage of power that is supplied by each of the first and second AC/DC converters.

11. The system of claim 10, wherein the bus controller is communicatively coupled to the vehicle management system of the aircraft to at least one of receive commands and share status information on a state of at least one of the aircraft power distribution system and the aircraft.

12. The system of claim 10, wherein the bus controller receives discrete input feedback from the aircraft power distribution system.

13. The system of claim 10, further comprising:
a third generator that generates a third AC voltage signal from an auxiliary power unit;
a third AC/DC converter that converts the third AC voltage signal to a third DC voltage;
a third dedicated DC bus that receives the third DC voltage and provides the third DC voltage to at least one third dedicated bus load, wherein the synchronization bus is selectively coupleable to the third dedicated DC bus by a third bus line switch to allow for selective bus sharing and bus isolation between the first, second and third dedicated DC buses via the bus controller.

14. The system of claim 10, wherein each AC/DC converter is part of an inverter controller that communicates with the bus controller to share status information of the aircraft power distribution system.

15. The system of claim 14, wherein each inverter controller includes a bus line contactor switch that couples and decouples the respective AC/DC converter from its respective dedicated DC bus.

16. The system of claim 10, further comprising:
a third generator that generates a third AC voltage signal from a second high pressure spool;
a fourth generator that generates a fourth AC voltage signal from a second low pressure spool;
a third AC/DC converter that converts the third AC voltage signal to a third DC voltage;
a fourth AC/DC converter that converts the fourth AC voltage signal to a fourth DC voltage signal;
a third dedicated DC bus that receives the third DC voltage and provides the third DC voltage to at least one third dedicated bus load;
a fourth dedicated DC bus that receives the fourth DC voltage and provides the fourth DC voltage to at least one fourth dedicated bus load, wherein the synchronization bus is selectively coupleable to the third dedicated DC bus by a third bus line switch and the fourth dedicated DC bus by a fourth bus line switch to allow for selective bus sharing between the first, second, third and fourth dedicated DC buses.

17. A method of distributing DC power in an aircraft, the method comprising;
generating, with a plurality of AC/DC converters associated with the aircraft, a plurality of DC voltages from a plurality of independent sources driven by one or more turbines of the aircraft;
providing each of the plurality of DC voltages to respective dedicated DC buses;
setting a plurality of switches that selectively couples a first set of dedicated DC buses to a synchronization bus to allow for bus sharing between the first set of dedicated DC buses and isolating a second set of dedicated DC buses; and
issuing a load share command, to the plurality of AC/DC converters, that governs a percentage of power that is supplied by each of the plurality of AC/DC converters.

18. The method of claim 17, further comprising monitoring at least one parameter of the aircraft and dynamically setting the plurality of switches based on changes in the monitored at least one parameter.

19. The method of claim 17, further comprising dynamically setting the plurality of switches based on commands received from a vehicle management system of the aircraft.

20. The method of claim 17, wherein the independent sources comprise at least one high pressure spool, at least one low pressure spool, and an auxiliary power unit.

* * * * *